United States Patent
Guo

(10) Patent No.: US 9,588,391 B2
(45) Date of Patent: Mar. 7, 2017

(54) LIQUID CRYSTAL PANEL, DISPLAY DEVICE, AND PROCESS FOR MANUFACTURING LIQUID CRYSTAL PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Renwei Guo, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 14/366,440

(22) PCT Filed: Apr. 28, 2013

(86) PCT No.: PCT/CN2013/074964
§ 371 (c)(1),
(2) Date: Jun. 18, 2014

(87) PCT Pub. No.: WO2014/146326
PCT Pub. Date: Sep. 25, 2014

(65) Prior Publication Data
US 2015/0085230 A1 Mar. 26, 2015

(30) Foreign Application Priority Data
Mar. 18, 2013 (CN) .......................... 2013 1 0086390

(51) Int. Cl.
C09K 19/56 (2006.01)
G02F 1/1368 (2006.01)
(Continued)

(52) U.S. Cl.
CPC ........ *G02F 1/1368* (2013.01); *B32B 37/1018* (2013.01); *B32B 37/24* (2013.01);
(Continued)

(58) Field of Classification Search
CPC ............................................... B32B 2457/202
(Continued)

(56) References Cited

U.S. PATENT DOCUMENTS 6,177,972 B1   1/2001 Held et al.
2003/0064173 A1   4/2003 Coates et al.
(Continued)

FOREIGN PATENT DOCUMENTS

CN   1641425 A   7/2005
CN   101158758 A   4/2008
(Continued)

OTHER PUBLICATIONS

International Search Report Appln. No. PCT/CN2013/074964; Dated Jan. 2, 2014.
(Continued)

*Primary Examiner* — Chanceity Robinson
(74) *Attorney, Agent, or Firm* — Ladas & Parry LLP

(57) ABSTRACT

Embodiments of the invention provide a liquid crystal panel, a display device, and a process for manufacturing the liquid crystal panel. The liquid crystal panel includes cell-assembled array substrate and colored substrate, and a liquid crystal layer between the array substrate and the colored substrate, wherein the liquid crystal layer includes a dual frequency liquid crystal and a polymer network anchoring the dual frequency liquid crystal, wherein the polymer network is formed by polymerization of liquid crystalline ultraviolet polymerizable monomers.

14 Claims, 2 Drawing Sheets

(51) Int. Cl.

| | | |
|---|---|---|
| *C09K 19/20* | (2006.01) | |
| *C09K 19/30* | (2006.01) | |
| *B32B 37/10* | (2006.01) | |
| *B32B 37/24* | (2006.01) | |
| *B32B 38/00* | (2006.01) | |
| *G02F 1/1335* | (2006.01) | |
| *G02F 1/1337* | (2006.01) | |
| *G02F 1/1341* | (2006.01) | |
| *G02F 1/1334* | (2006.01) | |
| *C09K 19/04* | (2006.01) | |
| *G02F 1/1333* | (2006.01) | |
| *G02F 1/137* | (2006.01) | |

(52) U.S. Cl.
CPC ...... *B32B 38/0008* (2013.01); *C09K 19/2007* (2013.01); *C09K 19/3068* (2013.01); *C09K 19/56* (2013.01); *G02F 1/1334* (2013.01); *G02F 1/1337* (2013.01); *G02F 1/1341* (2013.01); *G02F 1/133514* (2013.01); *B32B 2037/243* (2013.01); *B32B 2457/202* (2013.01); *C09K 2019/0448* (2013.01); *C09K 2019/2078* (2013.01); *G02F 2001/13415* (2013.01); *G02F 2001/13775* (2013.01); *G02F 2001/133354* (2013.01)

(58) Field of Classification Search
USPC .......................................................... 349/106
See application file for complete search history.

(56) References Cited

U.S. PATENT DOCUMENTS

| | | | |
|---|---|---|---|
| 2005/0185131 A1 | 8/2005 | Miyachi et al. | |
| 2006/0244887 A1* | 11/2006 | Lin ......................... | G02F 1/141 349/141 |
| 2008/0152843 A1* | 6/2008 | Kato .................. | C09K 19/2007 428/1.4 |
| 2010/0296040 A1 | 11/2010 | Han et al. | |
| 2011/0001917 A1 | 1/2011 | Araya et al. | |
| 2011/0141417 A1 | 6/2011 | Kim | |
| 2013/0242234 A1* | 9/2013 | Guo et al. ........................ 349/88 | |

FOREIGN PATENT DOCUMENTS

| | | | | |
|---|---|---|---|---|
| CN | 101671565 | A | | 3/2010 |
| CN | 101943818 | A | | 1/2011 |
| CN | 101968590 | A | | 2/2011 |
| CN | 101566755 | A | | 8/2011 |
| CN | 102464983 | A | * | 5/2012 |
| CN | 102629013 | A | * | 8/2012 |
| CN | 102643387 | A | | 8/2012 |
| CN | 102645778 | A | | 8/2012 |
| CN | 102955294 | A | | 3/2013 |
| EP | 0643121 | A1 | | 3/1995 |
| JP | 03-288823 | A | | 12/1991 |
| JP | 2002-122854 | A | | 4/2002 |
| KR | 20050075307 | A | | 7/2005 |
| KR | 20110004309 | A | | 1/2011 |

OTHER PUBLICATIONS

First Chinese Office Action Appln, No, 201310086390.4; Dated Jan. 26, 2015.
International Search Report mailed Jan. 3, 2013; PCT/CN2012/081429.
International Preliminary Report on Patentability issued Mar. 18, 2014; PCT/CN2012/081429.
International Preliminary Report on Patentability issued Sep. 22, 2015; PCT/CN2013/074964.
Partial Supplementary European Search Report dated Aug. 5, 2015; Appln. No. 12778030.2-1904 / 2755075 PCT/CN2012081429.
Extended European Search Report dated Sep. 16, 2015; Appln. No. 12778030.2-1904 / 2755075 PCT/CN2012081429.
First Chinese Office Action dated Jan. 22, 2014; Appln. No. 201110272490.7.
Second Chinese Office Action dated Apr. 25, 2014; Appln. No. 201110272490.7.
Third Chinese Office Action dated Jul. 21, 2014; Appln. No. 201110272490.7.
Korean Office Action dated Dec. 12, 2013; Appln. No. 10-2012-7031662.
USPTO FOA dated Jul. 16, 2015 in connection with U.S. Appl. No. 13/698,779.

* cited by examiner

LIQUID CRYSTAL PANEL, DISPLAY DEVICE, AND PROCESS FOR MANUFACTURING LIQUID CRYSTAL PANEL

TECHNICAL FIELD

Embodiments of the invention relate to a liquid crystal panel, a display device, and a process for manufacturing the liquid crystal panel.

BACKGROUND

In flat panel display devices, the thin film transistor liquid crystal display (TFT-LCD) has the advantages of small volume, low energy consumption, relatively low manufacturing cost, and low radiation, etc., thus takes the leading role in the current flat panel display market. Currently, the display modes for TFT-LCD are primarily the twisted nematic (TN) mode, vertical alignment (VA) mode, in-plane switching (IPS) mode, and advanced super dimension switch (AD-SDS or ADS) mode, etc.

An ADS mode based display forms a multi-dimensional electric field by the electric field generated at the edge of the common electrode within the same plane and the electric field generated between the common electrode layer and the plate electrode layer, enabling liquid crystal molecules of all orientations right above the common electrodes and between the common electrodes within the liquid crystal cell, so as to improve the working efficiency of the liquid crystal and increase the transmissive efficiency. The advanced super dimension switch technique can improve the graphic quality of TFT-LCD, enabling advantages such as high definition, high transmissivity, low energy consumption, wide visual angle, high aperture ration, low color difference, no push Mura, and the like.

Based on differences in the molecular arrangement, liquid crystals can be divided into nematic liquid crystals, smectic liquid crystals, and cholesteric liquid crystals, and the like. Currently, nematic liquid crystals are widely used in TFT-LCD, whereas use of other kinds of liquid crystals is limited. Nematic liquid crystals can be divided into positive nematic liquid crystals, negative nematic liquid crystals, and dual frequency liquid crystals. Where an electrophilic group is at the end of the long axis of a rod-like liquid crystal molecule, the dielectric constant of the liquid crystal ($\Delta\in$) is larger than zero, and the liquid crystal is positive. Where an electrophilic group is at the end of the short axis of a rod-like liquid crystal molecule, $\Delta\in$ is smaller than zero, and the liquid crystal is negative. Positive nematic liquid crystals are primarily used for display modes such as TN, ADS, IPS, and the like. Negative nematic liquid crystals are primarily used for modes such as VA and the like. For dual frequency liquid crystals, where it is under the action of the low frequency electric field, $\Delta\in$ is larger than zero, and the liquid crystal exhibits a positive dielectricity. Where it is under the action of the high frequency electric field, $\Delta\in$ is smaller than zero, and the liquid crystal exhibits a negative dielectricity. Because the dual frequency liquid crystal exhibits different electricity with the change of the electric field frequency, it may cause abnormality in the arrangement of the dual frequency liquid crystal molecules, and therefore it is difficult for applying to the liquid crystal display.

SUMMARY

One embodiment of the invention provides a liquid crystal panel comprising cell-assembled array substrate and colored substrate, and a liquid crystal layer between the array substrate and the colored substrate; the liquid crystal layer comprises a dual frequency liquid crystal and a polymer network anchoring the dual frequency liquid crystal, wherein the polymer network is formed by polymerization of liquid crystalline ultraviolet polymerizable monomers.

Another embodiment of the invention provides a display device comprising the aforesaid liquid crystal panel.

Still another embodiment of the invention provides a method for manufacturing the liquid crystal panel comprising forming a mixture by mixing, away from light, of 90%~98% by weight of dual frequency liquid crystal, 1~9% by weight of liquid crystalline ultraviolet polymerizable monomers, and 0.1%~1% by weight of a photoinitiator; de-foaming the mixture; dripping the de-foamed mixture onto the array substrate, coating a sealant on the color filter substrate, and align an array substrate and a color filter substrate under vacuum to form a liquid crystal cell; ultraviolet light radiating the liquid crystal cell to cause the polymerization of the liquid crystalline ultraviolet polymerizable monomers to form a polymer network; and heating the liquid crystal cell after the ultraviolet light radiation.

DESCRIPTION OF DRAWINGS

In order to more clearly illustrate the technical solution of the embodiment of the invention, the figure of the embodiment was briefly introduced below. Apparently, the figures in the following description merely relate to some embodiments of the invention, rather than limit the invention.

DETAILED DESCRIPTION

In order to make the object, the technical solutions and the advantages of the invention clearer, the technical solutions of the invention was described in a clear and complete manner in relation to the figures of the invention below. Apparently, the described embodiments are merely some, rather than all embodiments of the invention. All other embodiments obtainable by a person of ordinary skill in the art based on the embodiments of the invention described without inventive work fall into the scope of the invention.

Embodiments of the invention provide a crystal liquid panel, a dual frequency liquid crystal is applied to the liquid crystal display by controlling the arrangement of the dual frequency molecules, thereby optimizing the display of the liquid crystal panel. Embodiments of the invention further provide a method for manufacturing the liquid crystal panel and a display device comprising the aforesaid liquid crystal panel.

In the embodiments of the invention, the dual frequency liquid crystal is anchored by the polymer network generated by liquid crystalline ultraviolet light polymerizable monomers in the liquid crystal layer, which can induce the arrangement of the dual frequency liquid crystals, thereby applying the dual frequency liquid crystal to the liquid crystal display, so as to optimize the display of the liquid crystal panel.

Figure 1:
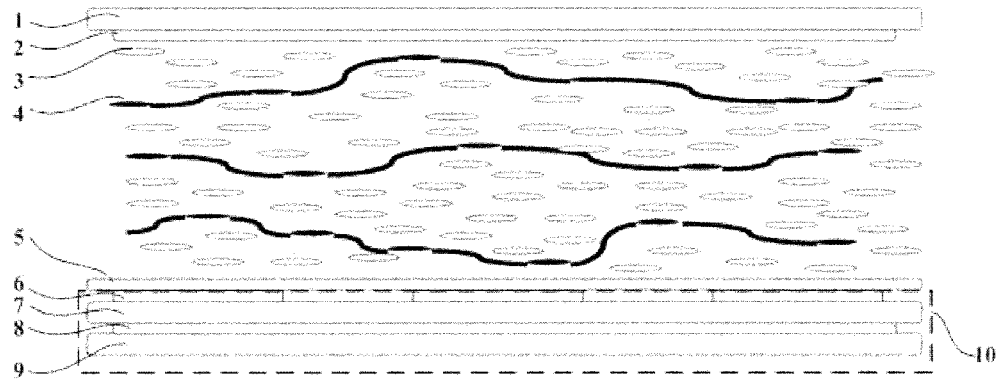
FIG. 1 is a structural diagram of the liquid crystal panel of ADS mode provided by an embodiment of the invention without electricity.

FIG. 1 is a structural diagram of the liquid crystal panel of ADS mode provided by an embodiment of the invention without electricity. The liquid crystal panel provided by the embodiment of the invention is described below in relation to FIG. 1.

As shown in FIG. 1, the liquid crystal panel provided in an embodiment of the invention may comprise an array substrate 10 and a color filter substrate 1 that are cell-assembled together, and a liquid crystal layer between the array substrate 10 and the color filter substrate 1, wherein the liquid crystal layer may comprise a dual frequency liquid crystal 3 and a polymer network 4 which anchors the dual frequency liquid crystal 3, wherein the polymer network 4 is formed by polymerization of the liquid crystalline ultraviolet light polymerizable monomers.

In the liquid crystal layer of the liquid crystal panel provided in the embodiment of the invention, the dual frequency liquid crystal molecule is anchored in the polymer network formed by polymerization of liquid crystalline ultraviolet polymerizable monomers. Because the liquid crystalline polymer network can interact with the dual frequency liquid crystal by applied force between molecules, thereby enabling the dual frequency liquid crystal molecules to arrange into a parallel orientation structure, and limit the slipping of the dual frequency liquid crystal molecules in the upper-lower, left-right, forward-backward directions, thereby enabling the dual frequency liquid crystals to be applied in the liquid crystal display. On the other hand, because the dual frequency liquid crystal can exhibit positive dielectricity under the low frequency electric field, and the liquid crystal display is usually conducted under the low frequency electric filed, the dual frequency liquid crystal can be applied to liquid crystal panels to which positive liquid crystal can be applied such as TN mode, IPS mode, or ADS mode, under the low frequency electric field. In an embodiment of the invention, for example, the dual frequency liquid crystal can be applied to a liquid crystal panel of ADS mode. In a liquid crystal panel of ADS mode, the long axis of the dual frequency liquid crystal molecule can be arranged along the tangential direction of the electric field line. In addition, if the orientation of the dual frequency liquid crystal molecule becomes abnormal, a high frequency electric field can be applied, so that the dual frequency liquid crystal exhibits negative dielectricity, and the long axis of the dual frequency liquid crystal molecule is arranged perpendicular to the tangential direction of the electric field line, which facilitates the dual frequency liquid crystal molecules to recover the initial parallel orientation structure. Therefore, in the liquid crystal panel provided in an embodiment of the invention, the arrangement of dual frequency liquid crystal molecules can be controlled by changing the frequency of the external electric field, thereby enabling controllable manipulation of the dual frequency liquid crystal molecules within the liquid crystal panel, so as to optimize the display of the liquid crystal panel. Moreover, because the dual frequency liquid crystal is anchored in the polymer network, when a low frequency electric field is applied, the dual frequency liquid crystal molecule can rapidly rotate to the desired angle under the action of the electric field, thereby improving the response rate of the dual frequency liquid crystal molecules, so as to shorten the response time of the display device.

In an embodiment of the invention, the frequency f of the low frequency electric field is higher than 100 Hertz and lower than 2000 Hertz (that is, 100 Hz<f<2000 Hz), and the frequency f of the high frequency electric field is higher than or equal to 2000 Hertz and lower than or equal to 30000 Hertz (that is, 2000 Hz≤f≤30000 Hz).

In an embodiment of the invention, for example, the chemical structural formula of the liquid crystalline ultraviolet polymerizable monomers is:

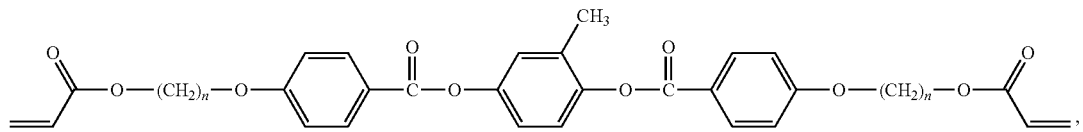

wherein n=3, 4, 5, 6, 7 or 8.

In an embodiment of the invention, the liquid crystalline ultraviolet light polymerizable monomers may be versatile. It may form a polymer network under the ultraviolet radiation, for example, the molecule has a structure of carbon-carbon double bond at an end, and this monomer needs to be liquid crystalline so as to be capable of more efficiently dissolving in liquid crystal molecules. A liquid crystalline monomer, like a liquid crystal molecule, can exhibit different orientations under the action of different orientation agents. After the liquid crystalline ultraviolet polymerizable monomers forms a polymer network, the arrangement of the dual frequency liquid crystal molecules within it can be fixed by way of anchoring force. For example, in an embodiment of the invention, a molecule having the chemical structural formula of

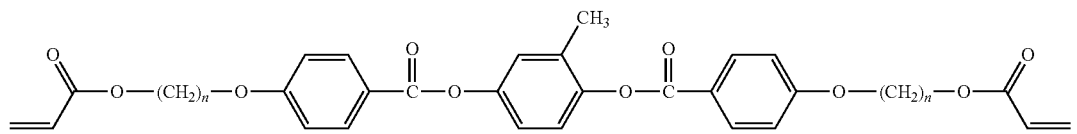

can be used as the liquid crystalline ultraviolet polymerizable monomers, wherein n=3, 4, 5, 6, 7 or 8. In an embodiment of the invention, the monomer can be subject to different structural modifications, as long as it does not affect its liquid crystallinity and its property for forming polymer network. In such a monomer, where n=3, the chemical name of the monomer is 1,4-bis(4-(6'-acryloyloxypropoxy)benzoyloxy)-2-toluene; where n=4, the chemical name of the monomer is 1,4-bis(4-(6'-acryloyloxybutoxy)benzoyloxy)-

2-toluene; where n=5, the chemical name of the monomer is 1,4-bis(4-(6'-acryloyloxypentoxy)benzoyloxy)-2-toluene; where n=6, the chemical name of the monomer is 1,4-bis(4-(6'-acryloyloxyhexoxy)benzoyloxy)-2-toluene; where n=7, the chemical name of the monomer is 1,4-bis(4-(6'-acryloyloxypropyloxy)heptoxy)-2-toluene; and where n=8, the chemical name of the monomer is 1,4-bis(4-(6'-acryloyloxyoctoxy)benzoyloxy)-2-toluene.

use in a liquid crystal panel, therefore, a mixed liquid crystal formed by a plurality of kinds of fluorine containing dual frequency liquid crystal molecules may be employed in the liquid crystal layer of the liquid crystal panel provided in an embodiment of the invention.

In an embodiment of the invention, for example, the fluorine containing dual frequency liquid crystal molecules in the mixed liquid crystal may comprise:

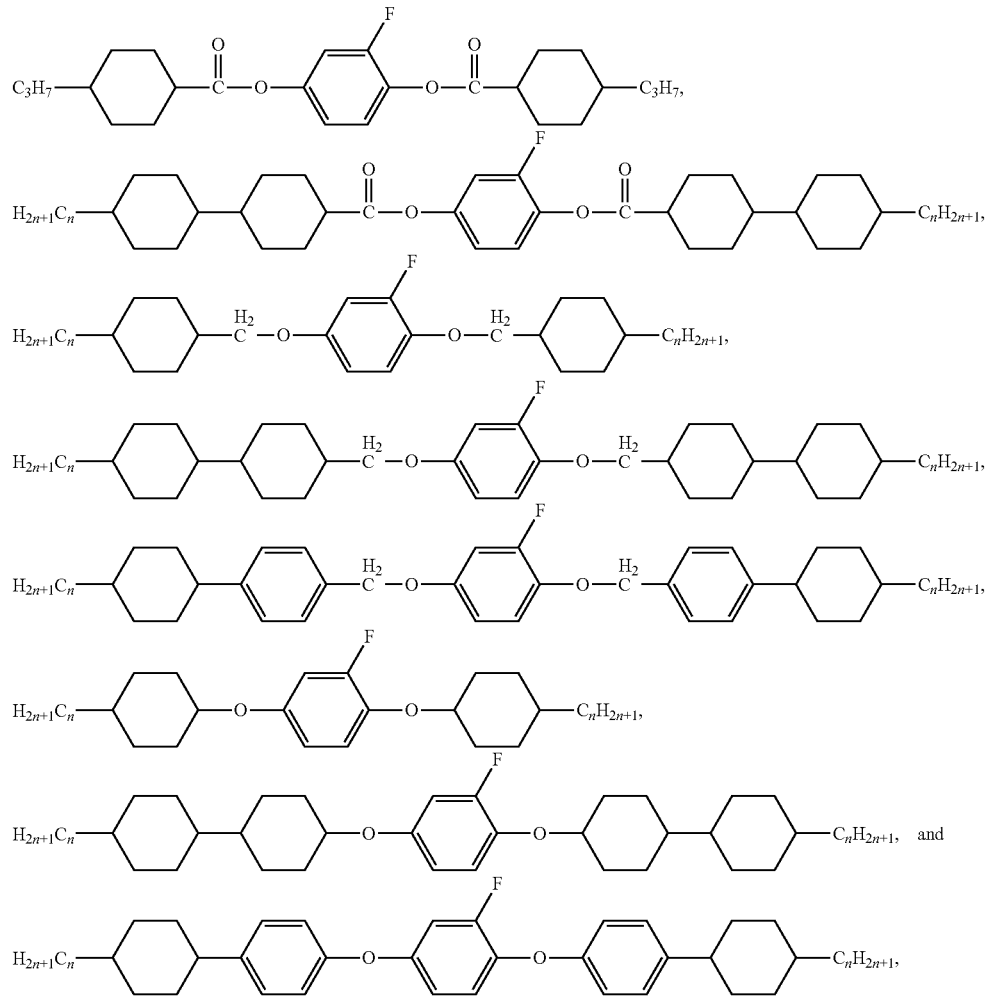

In an embodiment of the invention, for example, the dual frequency liquid crystal may be a mixed liquid crystal obtained by a plurality of kinds of fluorine containing dual frequency liquid crystal molecules.

In the structure of the dual frequency liquid crystal, the long axis of the liquid crystal molecule is dispersed with the combination of a benzene ring, hexane, and ester group (or ether linkage), wherein the benzene ring within the molecule may have electrophilic groups such as fluoro functionality and/or chloro functionality. The liquid crystal molecule of this structure has an electrophilic group in the short axis, thereby exhibiting the property of a dual frequency liquid crystal. In an embodiment of the invention, for example, a fluoro containing dual frequency liquid crystal molecule may be employed. Because the dual frequency molecule of a single type has a high melting point and is not suitable for wherein n=3, 4, 5, 6, 7 or 8, but the embodiments of the invention are not limited to this.

In the invention, for each one of the aforesaid eight fluorine containing dual frequency liquid crystal molecules, n can be selected from 3, 4, 5, 6, 7 or 8. In a mixed liquid crystal formed from the aforesaid eight fluorine containing dual frequency liquid crystal molecules, the number "n" of each fluorine containing dual frequency liquid crystal molecule can be selected as the same or different, and the embodiments of the invention are not limited to this. For example, in an embodiment of the invention, the number "n" can be selected as the same in the eight fluorine containing dual frequency liquid crystal molecules that form the mixed liquid crystal.

In an embodiment of the invention, the range of the display temperature of the aforesaid eight fluorine containing dual frequency liquid crystal molecules are −30° C.-80° C.

In an embodiment of the invention, the range of the weight percentage of each kind of fluorine containing dual frequency liquid crystal molecules in the mixed liquid crystal is 5%~15%. In an embodiment of the invention, for example, the weight percentage of each kind of fluorine containing dual frequency liquid crystal molecules in the mixed liquid crystal is 12.5%.

In an embodiment of the invention, the range of the weight percentage of each kind of fluorine containing dual frequency liquid crystal molecules in the mixed liquid crystal can be 5%~15%, and the weight percentage of each fluorine containing dual frequency liquid crystal molecule may be the same or different, and the embodiments of the invention are not limited to this. In some embodiments of the invention, for example, where n=4, the weight percentages of the aforesaid eight fluorine containing dual frequency liquid crystal molecules are 13%, 10%, 15%, 10%, 13%, 14%, 13% and 12%, respectively; where n=5, the weight percentages of the aforesaid eight fluorine containing dual frequency liquid crystal molecules are 5%, 11%, 14%, 15%, 13%, 14%, 15% and 13%, respectively; where n=6, the weight percentages of the aforesaid eight fluorine containing dual frequency liquid crystal molecules are 15%, 8%, 10%, 15%, 13%, 14%, 12% and 13%. In some embodiments of the invention, the weight percentage of each of the aforesaid eight fluorine containing dual frequency liquid crystal molecules in the mixed liquid crystal is 12.5%, that is, they have the same weight percentage. After mixing, the melting point of the dual frequency liquid crystal molecule decreases, and is suitable for use in the liquid crystal display.

Again refer to FIG. 1. The liquid crystal panel provided by an embodiment of the invention may further comprise a first parallel alignment layer 2 disposed on the side of the color filter substrate 1 facing the liquid crystal layer, and a second parallel alignment layer 5 disposed on the side of the array substrate 10 facing the liquid crystal layer.

In an embodiment of the invention, because the first parallel alignment layer 2 and the second parallel alignment layer 5 are formed on the color filter substrate 1 and the array substrate 10, respectively, the molecular long axis directions of the liquid crystalline ultraviolet polymerizable monomers and the dual frequency liquid crystal molecule are both arranged parallel to the substrate. After ultraviolet light radiation, the liquid crystalline ultraviolet polymerizable monomers undergoes polymerization to form the polymer network 4, which can fix the dual frequency liquid crystal molecules by the action of the anchoring force to make them still arranged parallel to the substrate along the molecular long axis direction, thereby allowing normal orientation of the dual frequency liquid crystal molecules and optimizing the display of the liquid crystal panel.

The liquid crystal panel provided in an embodiment of the invention may be applied to TN mode, VA mode, IPS mode or ADS mode. For example, the liquid crystal panel provided in an embodiment of the invention may be applied to ADS mode. Please again refer to FIG. 1, the ADS mode liquid crystal panel provided by an embodiment of the invention may further comprises: a pixel electrode 8 formed on the transparent substrate 9, an insulation layer formed on the pixel electrode 8, and a silt-like common electrode 6 formed on the insulation layer 7.

Figure 2:
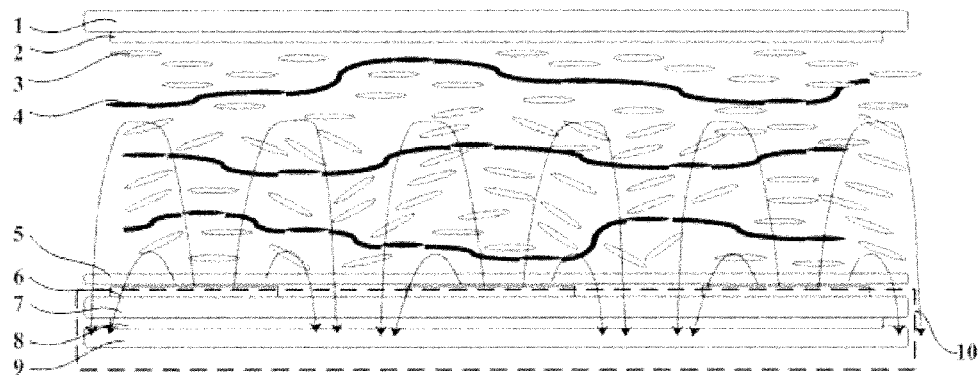
FIG. 2 is a structural diagram of the liquid crystal panel of ADS mode provided by an embodiment of the invention with electricity.

One illustrative example is used to explain the mechanism of the display of the ADS mode liquid crystal panel provided in an embodiment of the invention. As shown in FIG. 1, without electricity, in the liquid crystal panel, after the action of the parallel alignment layer, all long axes of the dual frequency liquid crystal molecules will be arranged parallel to the substrate; moreover, because the ultraviolet polymerizable monomer has liquid crystallinity, the molecules of this monomer will also be arranged parallel to the substrate. After initiation by the photoinitiator, the ultraviolet light polymerizable monomers will form a polymer network, which can fix the direction of the arrangement of the long axes of the liquid crystal molecules by the action of the anchoring force. FIG. 2 is a structural diagram of the liquid crystal panel of ADS mode provided by an embodiment of the invention with electricity, wherein by using a low frequency electric field, the dual frequency liquid crystal molecule exhibits positive dielectricity. As shown in FIG. 2, with electricity, an electric field is generated at the edge of the common electrode 6, and the dual frequency liquid crystal molecules will be arranged along the tangential direction of the electric field line and rotate. After withdrawal of the electric field, because the polymer network has an anchoring action on the liquid crystal molecules, the liquid crystal molecules resume their states before the electricity under the action of the polymer network. By the action of the switching on and off of the electric field, the liquid crystal molecules may rotate or recover, thereby achieving the object of liquid crystal display.

Embodiments of the invention further provide a display device comprising any one of the aforesaid liquid crystal panel. In an embodiment of the invention, the display device may be any product or component having display function such as liquid crystal panel, e-paper, OLED panel, liquid crystal TV, liquid crystal display, digital frame, cellular phone, tablet computer, and the like. By using the aforesaid liquid crystal panel in the display device, the display of the display device can be optimized.

The embodiments of the invention further provide a process for manufacturing the liquid crystal panel comprising:

forming a mixture by mixing, away from light, of 90%~98% by weight of dual frequency liquid crystal, 1~9% by weight of liquid crystalline ultraviolet polymerizable monomers, and 0.1%~4% by weight of a photoinitiator;

de-foaming the mixture;

dripping the de-foamed mixture onto the array substrate, coating a sealant on the color filter substrate, and align the array substrate and the color filter substrate under vacuum to form a liquid crystal cell;

ultraviolet light radiating the liquid crystal cell to cause the polymerization of the liquid crystalline ultraviolet polymerizable monomers to form a polymer network; and heating the liquid crystal cell after the ultraviolet light radiation.

In an embodiment of the invention, because the liquid crystalline ultraviolet polymerizable monomers in the liquid crystal layer undergoes polymerization to form a polymer network that can anchor the dual frequency liquid crystal molecule, therefore it allows the uniform arrangement of the dual frequency liquid crystals, thereby allowing the dual frequency to be applied in the liquid crystal panel, and optimizing the display of the liquid crystal panel by actions of the low frequency electric field on the display of the dual frequency liquid crystal and the high frequency electric field on the orientation of the dual frequency liquid crystal.

In an embodiment of the invention, the dual frequency liquid crystal may be a mixed crystal by mixing fluoro containing dual frequency liquid crystal molecules. For example, the fluoro containing dual frequency liquid crystal molecules may be selected from the eight fluoro containing dual frequency molecules. The liquid crystalline ultraviolet polymerizable monomers may also be selected from the liquid crystalline ultraviolet polymerizable monomers in the liquid crystal layer of the aforesaid liquid crystal panel. The photoinitiator may be selected from common photoinitiators, such as α,α-diethoxyacetophenone, α-hydroxyalkylphenone, or α-aminoalkylphenone.

In an embodiment of the invention, 90%~98% by weight of the dual frequency liquid crystal, 1~9% by weight of the liquid crystalline ultraviolet polymerizable monomers, and 0.1%~1% by weight of the photoinitiator are mixed away from light to form the mixture. For example, the mixing can be conducted using the aforesaid weight ratio: 90% by weight of the dual frequency liquid crystal, 9% by weight of the liquid crystalline ultraviolet polymerizable monomers, and 1% by weight of the photoinitiator are mixed away from light to form the mixture, or 95% by weight of the dual frequency liquid crystal, 4.9% by weight of the liquid crystalline ultraviolet polymerizable monomers, and 0.1% by weight of the photoinitiator are mixed away from light to form the mixture, or 98% by weight of the dual frequency liquid crystal, 1% by weight of the liquid crystalline ultraviolet polymerizable monomers, and 1% by weight of the photoinitiator are mixed away from light to form the mixture.

In an embodiment of the invention, for example, the intensity of the ultraviolet light radiation is 1~80 mW/cm$^2$, and the duration of the radiation is 5~200 minutes.

In an embodiment of the invention, for example, the mixture is de-foamed for a duration of 1~3 hours.

In an embodiment of the invention, dripping the de-foamed mixture onto the array substrate before coating the sealant onto the color filter substrate may further comprising performing parallel alignment treatment on the array substrate and the color filter substrate, respectively.

The method for manufacturing the ADS mode liquid crystal panel as shown in FIG. 1 is illustrated below in reference to illustrative examples. The flow chart for the manufacturing process may comprise the following steps:

Step 101, the same weight of the aforesaid eight fluorine containing dual frequency liquid crystal molecules are mixed to form a mixed liquid crystal;

Step 102, the mixed liquid crystal, the liquid crystalline ultraviolet polymerizable monomers and the photoinitator are mixed to form a mixture, wherein the weight percentage of the mixed liquid crystal is 90~98%, the weight percentage of the liquid crystalline ultraviolet polymerizable monomers is 1~9%, and the weight percentage of the photoinitator is 0.1~1%;

Step 103, the mixture is placed in a de-foamer for de-foaming treatment for a duration of 1~3 hours;

Step 104, the de-foamed mixture is dripped onto the array substrate, the sealant is coated onto the color filter substrate, and the liquid crystal cell is formed by aligning the array substrate and the color filter substrate under vacuum;

Step 105, the liquid crystal cell is subject to ultraviolet light radiation to allow the liquid crystalline ultraviolet polymerizable monomers to undergo polymerization to form a polymer network, as well as allow the ultraviolet polymerizable monomer in the sealant to polymerize; and Step 106, the liquid crystal cell radiated by ultraviolet light is heated to allow the polymerization of the heat polymerizable monomers in the sealant to allow the array substrate to bind to the color filter substrate.

Figure 3:
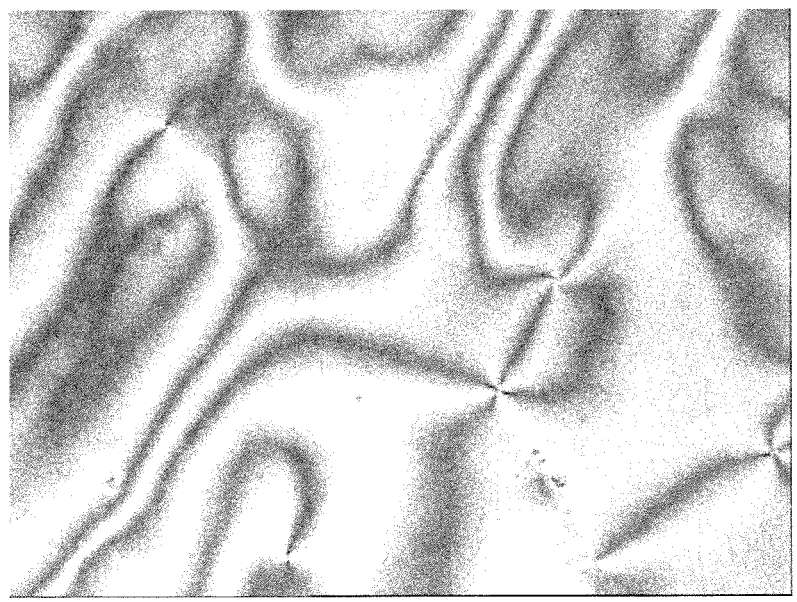
FIG. 3 is a polarized microscopy diagram of the liquid crystal layer of the liquid crystal panel of ADS mode provided by an embodiment of the invention.
Figure 4:
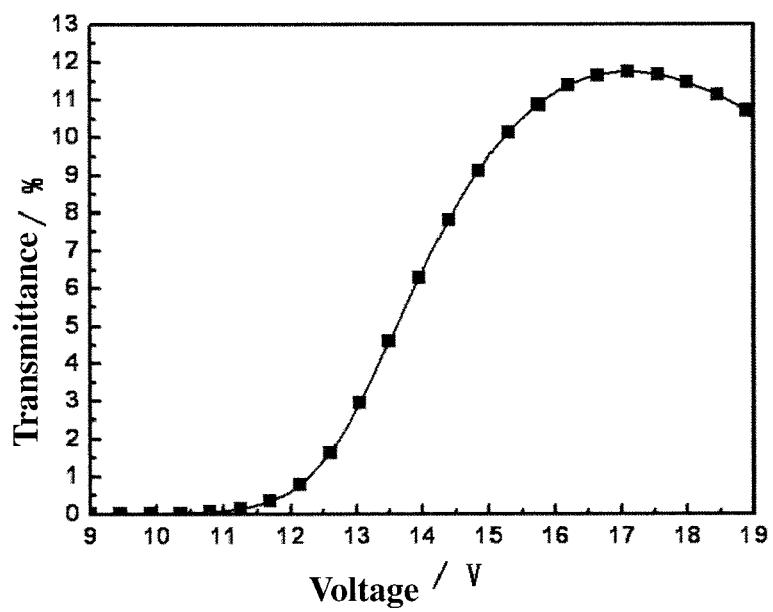
FIG. 4 is the voltage vs. transmissivity plot of the liquid crystal panel of ADS mode provided by an embodiment of the invention.

In an embodiment of the invention, the polymer network formed by polymerization of the liquid crystalline ultraviolet polymerizable monomers can anchor the arrangement of the dual frequency liquid crystal molecules, thereby allowing the dual frequency liquid crystal to be applied to the liquid crystal panel. It was detected that the range of the display temperature of the liquid crystal panel is between −30° C. and 80° C., and the liquid crystal panel thus prepared can be used for display under normal temperature. As shown in FIG. 3, FIG. 3 is a polarized microscopy diagram of the liquid crystal layer of the liquid crystal panel of ADS mode provided by an embodiment of the invention, in which obvious schlieren texture can be seen. Schlieren texture is a specific property for nematic liquid crystals. That this liquid crystal layer has this schlieren texture indicates that the liquid crystal layer can be used for liquid crystal display. FIG. 4 is the voltage vs. transmissivity plot of the liquid crystal panel of ADS mode provided by an embodiment of the invention, which is obtained by testing the liquid crystal panel using a liquid crystal comprehensive tester, and is measured under the low frequency state. From FIG. 4, it can be seen that the maximal transmissivity of the liquid crystal panel is close to 12%, and the driving voltage at that time is close to 16V. Moreover, during the application of the voltage, initially the transmissivity of the liquid crystal panel is small. With the increase of the driving voltage, the transmissivity of the liquid crystal panel also increases. After passing the peak, the transmissivity of the liquid crystal panel will slightly decrease. After electricity is removed, the transmissivity of the liquid crystal panel is also close to 0. This kind of voltage-transmissivity curve complies with the relation between the voltage and transmissivity of ADS mode liquid crystal panels. This also indicates that the liquid crystal panels prepared by the methods provided in an embodiment of the invention can be applied to the ADS mode.

Finally, it shall be illustrated that the aforesaid examples are merely used to illustrate the technical solutions of the invention, rather than limit them. Although the invention is illustrated in details in reference to the aforesaid examples, a person of ordinary skill in the art shall appreciate that modifications can still be made to the technical solutions recited in the aforesaid examples, or equivalent substitutions can be made to some technical features, while such modifications or substitutions will not make the nature of the corresponding technical solutions depart from the spirits and scopes of the technical solutions of the examples of the invention.

The invention claimed is:

1. A liquid crystal panel comprising an array substrate and a color filter substrate which are cell-assembled, and a liquid crystal layer between the array substrate and the color filter substrate, wherein the liquid crystal layer comprises a dual frequency liquid crystal and a polymer network anchoring the dual frequency liquid crystal, and wherein the polymer network is formed by polymerization of liquid crystalline ultraviolet polymerizable monomers, and the dual frequency liquid crystal is a mixed liquid crystal comprising a plurality of kinds of fluorine containing dual frequency liquid crystal molecules, wherein a chemical structural formula of liquid crystalline ultraviolet polymerizabie monomers is:

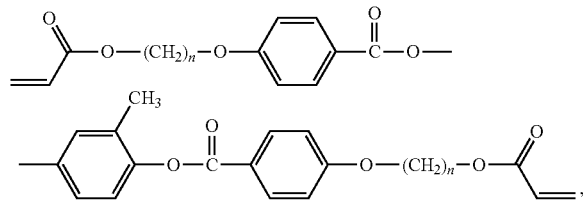

wherein n=3, 4, 5, 6, 7 or 8; and
wherein the fluorine containing dual frequency liquid crystal molecules in the mixed liquid crystal comprise:

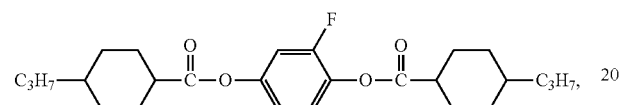

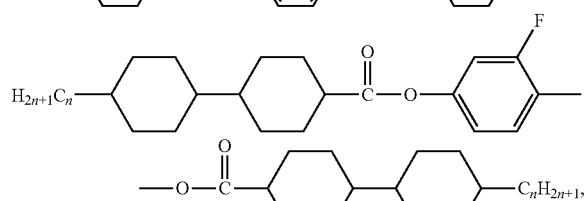

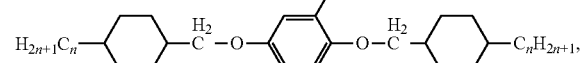

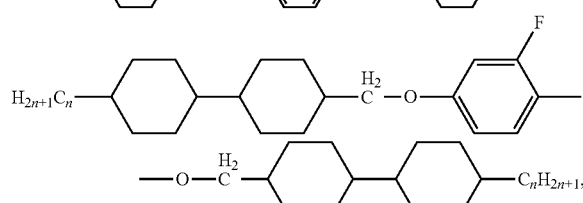

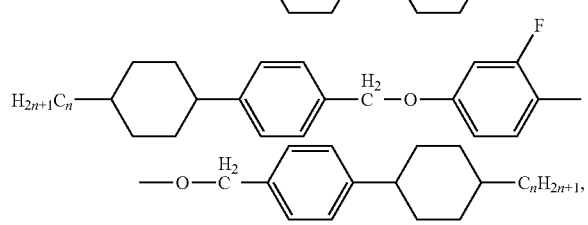

-continued

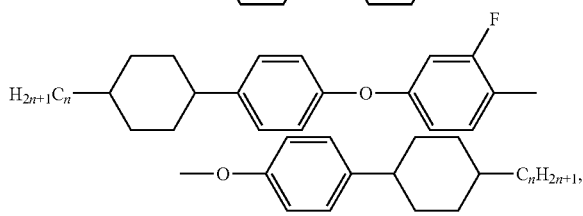

wherein n=3, 4, 5, 6, 7 or 8.

2. The liquid crystal panel according to claim 1, wherein a range of the weight percentage of each kind of fluorine containing dual frequency liquid crystal molecules in the mixed liquid crystal is 5%-15%.

3. The liquid crystal panel according to claim 2, wherein the weight percentage of each kind of fluorine containing dual frequency liquid crystal molecules in the mixed liquid crystal is 12.5%.

4. The liquid crystal panel according to claim 1, further comprising a first parallel alignment layer disposed on a side of the color filter substrate facing the liquid crystal layer, and a second parallel alignment layer disposed on aside of the array substrate facing the liquid crystal layer.

5. A display device comprising the liquid crystal panel according to claim 1.

6. A process for manufacturing a liquid crystal panel comprising:

forming a mixture by mixing, away from light, of 90%-98% by weight of dual frequency liquid crystal, 1-9% by weight of liquid crystalline ultraviolet polymerizable monomers, and 0.1%-1% by weight of a photoinitiator, wherein the dual frequency liquid crystal is a mixed liquid crystal obtained by a plurality of kinds of fluorine containing dual frequency liquid crystal molecules; wherein a chemical structural formula of liquid crystalline ultraviolet polymerizable monomers is:

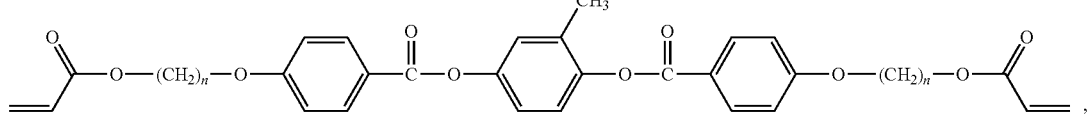

wherein n=3, 4, 5, 6, 7 or 8;
wherein the fluorine containing dual frequency liquid crystal molecules in the mixed liquid crystal comprise:

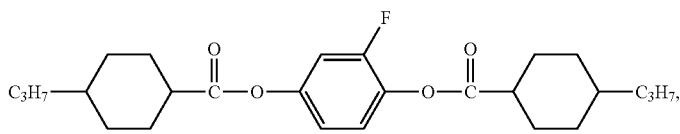

-continued

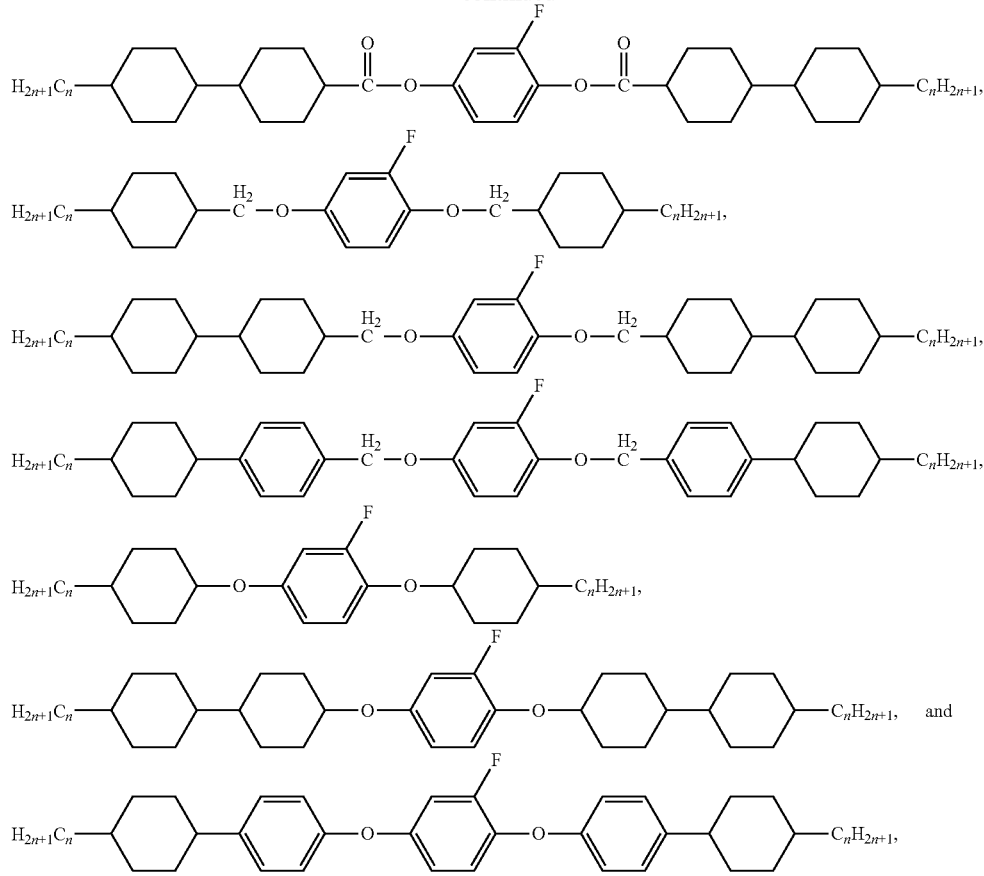

wherein n=3, 4, 5, 6, 7 or 8;
de-foaming the mixture;
dripping the de-foamed mixture onto an array substrate, coating a sealant on a color filter substrate, and align the array substrate and the color filter substrate under vacuum to form a liquid crystal cell;
ultraviolet light radiating the liquid crystal cell to cause polymerization of the liquid crystalline ultraviolet polymerizable monomers to form a polymer network; and
heating the liquid crystal cell after the ultraviolet light radiation.

7. The process for preparing the liquid crystal panel according to claim 6, wherein an intensity of the ultraviolet light radiation is 1-80 mW/cm$^2$, and a duration of the radiation is 5-200 minutes.

8. The process for preparing the liquid crystal panel according to claim 6, wherein the mixture is de-foamed for a duration of 1-3 hours.

9. The process for preparing the liquid crystal panel according to claim 6, wherein dripping the de-foamed mixture onto the array substrate before coating the sealant onto the color filter substrate further comprises performing parallel alignment treatment on the array substrate and the color filter substrate, respectively.

10. The liquid crystal panel according to claim 1, further comprising a first parallel alignment layer disposed on a side of the color filter substrate facing the liquid crystal layer, and a second parallel alignment layer disposed on a side of the array substrate facing the liquid crystal layer.

11. The liquid crystal panel according to claim 2, further comprising a first parallel alignment layer disposed on a side of the color filter substrate facing the liquid crystal layer, and a second parallel alignment layer disposed on a side of the array substrate facing the liquid crystal layer.

12. The liquid crystal panel according to claim 3, further comprising a first parallel alignment layer disposed on a side of the color filter substrate facing the liquid crystal layer, and a second parallel alignment layer disposed on a side of the array substrate facing the liquid crystal layer.

13. The process for preparing the liquid crystal panel according to claim 7, wherein dripping the de-foamed mixture onto the array substrate before coating the sealant onto the color filter substrate further comprises performing parallel alignment treatment on the array substrate and the color filter substrate, respectively.

14. The process for preparing the liquid crystal panel according to claim 8, wherein dripping the de-foamed mixture onto the array substrate before coating the sealant onto the color filter substrate further comprises performing parallel alignment treatment on the array substrate and the color filter substrate, respectively.

* * * * *